Dec. 2, 1952     E. S. VON KREUDENSTEIN     2,619,841
VARIABLE-SPEED POWER TRANSMISSION MECHANISM
Filed Oct. 11, 1950     3 Sheets—Sheet 1
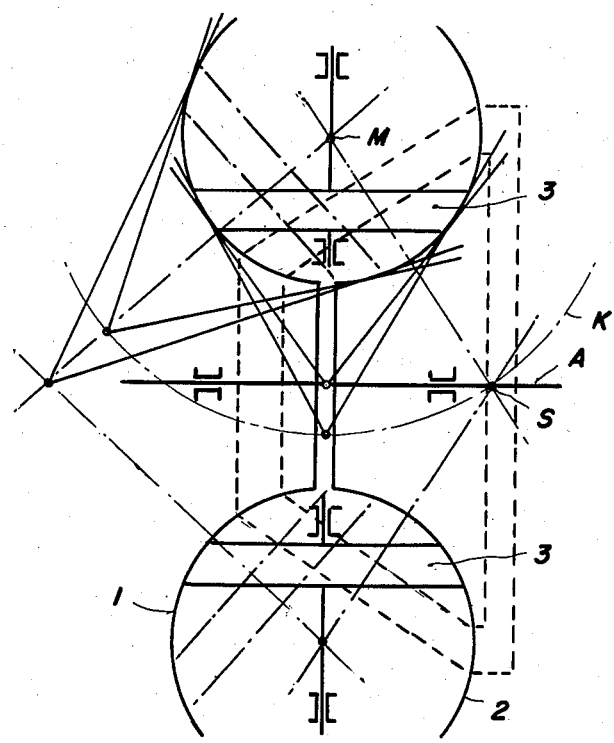
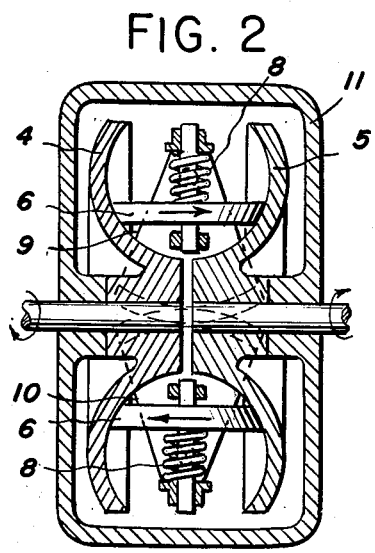
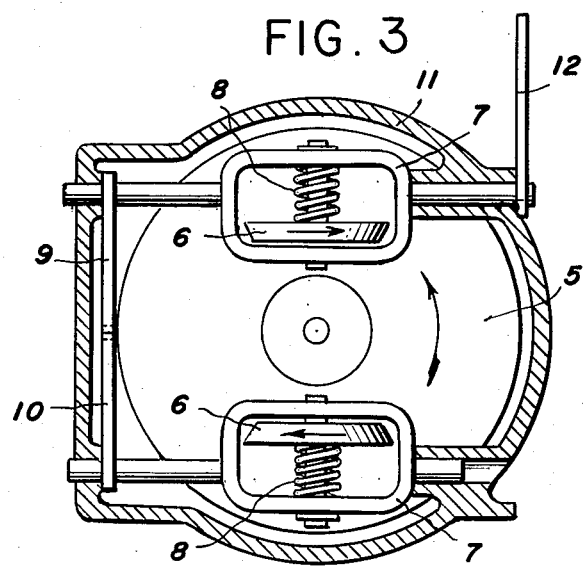
Inventor
Emil Spreter von Kreudenstein,
By *Ogle P. Singleton*
Attorney Dec. 2, 1952     E. S. VON KREUDENSTEIN     2,619,841
VARIABLE-SPEED POWER TRANSMISSION MECHANISM
Filed Oct. 11, 1950                          3 Sheets-Sheet 2
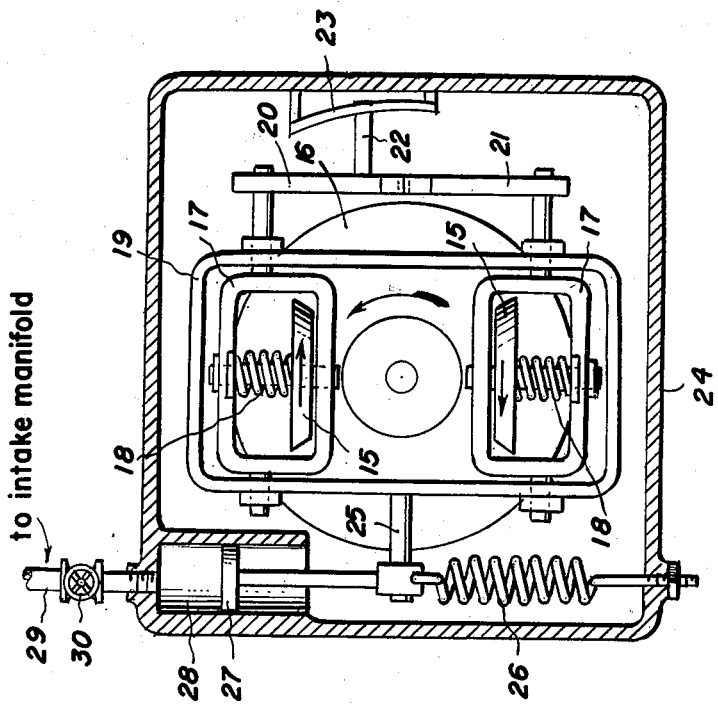
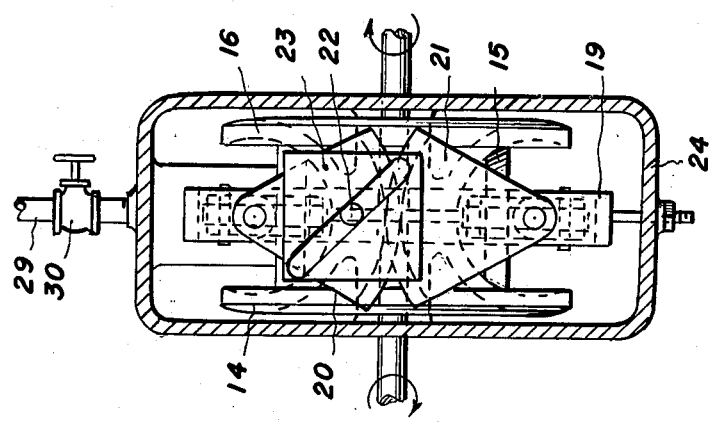
Inventor
Emil Spreter von Kreudenstein,
By *Ogle P. Singleton*
Attorney Dec. 2, 1952   E. S. VON KREUDENSTEIN   2,619,841
VARIABLE-SPEED POWER TRANSMISSION MECHANISM
Filed Oct. 11, 1950   3 Sheets-Sheet 3

Inventor
Emil Spreter von Kreudenstein,

By *Ogle R. Singleton*
Attorney

Patented Dec. 2, 1952

2,619,841

UNITED STATES PATENT OFFICE 2,619,841

VARIABLE-SPEED POWER TRANSMISSION MECHANISM

Emil Spreter von Kreudenstein, Belgrade, Yugoslavia, assignor of one-fourth to George J. Storz, Washington, D. C.

Application October 11, 1950, Serial No. 189,527
In France December 8, 1947

7 Claims. (Cl. 74—200)

The present invention relates to variable speed power transmission mechanism using frictionally engaged elements, for fixed or mobile power plants, for example for machine tools and automotive vehicles. Due to the character of their construction, the kinematic condition of such mechanisms heretofore known is objectionable, since the friction elements must slip on one another to a greater or lesser extent. This action reduces efficiency. Moreover, such action causes considerable heating of the parts and consequently their rapid destruction, if considerable force is transmitted. Therefore, such devices have been used only for transmitting small force and in subordinate places.

For example, a device is known in which co-axial driving and driven members having power transmitting surfaces constitute discs having annular arc-shaped tracks. In the tracks of said discs, there rotate adjustable friction transmission rollers, the axes of said rollers intersecting the disc axes. The diameters of said friction rollers are that of the cross-section of the tracks. On examining the kinematic conditions, it will be seen that only the middle peripheral line of each friction roller does not slip, while all the other peripheral lines have to slip, to a degree determined by their distance from said middle. This slipping action has to be taken into consideration, since the width of the friction roller cannot be narrowed as desired, in view of the force to be transmitted and of the limited specific pressure acting on the power transmitting surfaces of the driving and driven members. Losses in the order of 15 to 20% are caused in the transmission of power as in normal automotive vehicles. Thus the efficiency of the device is correspondingly lowered. Since this loss is converted into heat, the mechanism is heated to a great extent and, therefore, rapidly destroyed.

The object of the present invention is to overcome these disadvantages and is attained by placing the friction rollers so close to the common axis of the driving and driven members that these rollers and members constitute approximately a theoretically true bevel drive in each position. Examining the kinematic conditions of such a mechanism, it will be observed that the friction rollers slip only to the extent they differ from the geometrical form of a cone. Since that amount is comparatively small, the construction comes close to the ideal. Experience has proven that with equal width of the friction rollers of known devices and of those according to the present invention, the slip losses in the first case are 17%, while those in the second case are 2.5%.

Due to the structure of the device to provide the bevel, it is not necessary, for the drive ratio, that all the friction rollers have the same diameter at a given adjustment, while this is required in the known form of variable friction drives. Therefore, it is possible, and this is an additional feature of this invention, to hold the friction rollers engaged with the driving and driven members, by compression springs located above the roller axles.

It has been known that in order to obtain a theoretically correct bevel drive, it is necessary that the apices of the cones coincide at one point. According to the present invention, this condition can only be fulfilled with two transmission ratios inverse with respect to one another, because the cone apices of the friction rollers move through a circular path during the adjustment, said circular path intersecting the common axis of the two discs at two points. In all other positions, the difference between the theoretical and actual cone shape is increased, and then the friction rollers slip to a greater extent. This slip action, however, takes place to a limited extent and amounts only to fractions of a per cent. By suitable selection of the angle of the cone of the friction rollers—and this is another additional feature of the present invention—it is possible that the transmission ratios most frequently occurring coincide with the greatest efficiency, or at least lie in its neighborhood.

Mechanism with the above described features can be employed to great advantage, particularly in machine tools and the like, in which frequent changes of speed are required and wherein a manual setting of the drive ratio is sufficient. It is desirable that in certain machine tools, for example, lathes adapted to turn discs of large diameters, the drive ratio be automatically adjusted to fit the power required by the instant operative condition. This requirement is met in accordance with a further feature of the present invention, by providing means to constantly measure the difference in momentum between driving and driven sides of the device and according to said difference effect a control movement, adjusting the friction rollers for a pre-determined drive ratio. For example, the friction rollers with their adjustment means may be mounted on a support which is mounted for rotation about the axes of the driving and driven members. This support is biased by a return spring having a characteristic which is adapted to the momentum of rotation of the motor and to the highest transmission ratio of the device. The adjusting means is operatively connected to control means, mounted on a housing and adapted to automatically provide a driving ratio most favorable to the instant operating condition. In addition to the automatic adjusting means, there may be provided a manual adjusting means.

In automotive vehicles, it is desirable that the transmission ratio be automatically adjusted to the instant operating condition of the vehicle, i. e., the instant momentum of rotation of the motor and the momentum of rotation required to drive the vehicle, so that the driver's whole attention can be concentrated on the steering of the vehicle and he can control the desired speed by operating only the accelerator pedal, whereby always the most favorable driving ratio is secured. This requirement is met according to a further feature of the present invention by providing a biasing return force acting on the device for measuring the difference in momentum of rotation and for adjusting the transmission ratio, whereby the return force is reduced in a ratio inverse with respect to the momentum of rotation of the motor. This is preferably obtained by providing a suction-operated servomotor, connected to the intake pipe of the motor, and adapted to counteract the action of the return spring.

Certain engines, for example, turbines, as well as Otto-motors, require or make it desirable that the driving member operate constantly and independently of the load of the driven member. This result is obtained by providing a centrifugal pump actuated by the driving member.

Further details and advantages of the device of the invention will be apparent from the following description and the attached drawings illustrating embodiments of the invention, the scope of which is defined by the claims.

In said drawings:

Figure 1 is a diagrammatic illustration of the principle of operation of the device according to the invention.

Figures 2 and 3 illustrate an embodiment of the invention with manual adjusting means, being vertical sections in longitudinal and transverse planes respectively, with respect to the main axis of the device.

Figures 4 and 5 illustrate a second embodiment of the invention, for an automotive vehicle, with automatic adjusting means, being vertical sections longitudinal and transverse planes, respectively, with respect to the main axis of the device.

Figure 7:
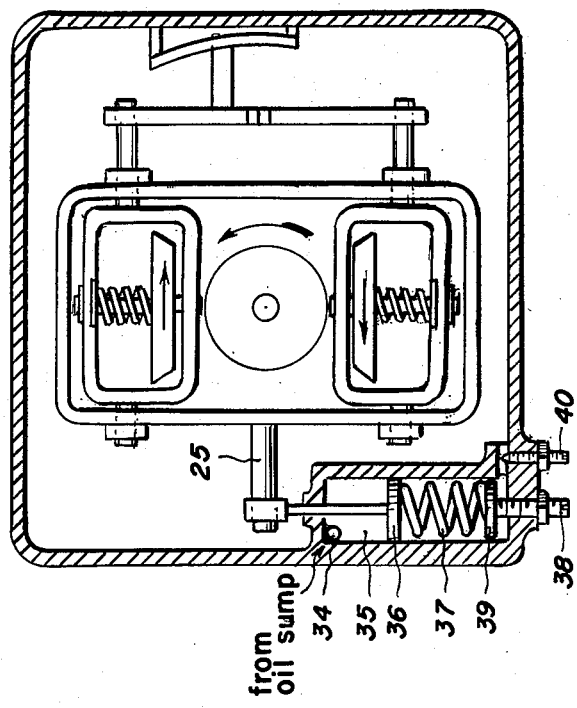
Figures 6 and 7 illustrate another embodiment, for automotive vehicles, being vertical sections similar to Figures 4 and 5.

In Figure 1, the device is diagrammatically shown and its basic principle of operation will be explained with reference to this figure.

The device has two discs 1 and 2, mounted on coaxial driving and driven shafts, respectively, and having annular arc-shaped tracks. A pair of friction rollers 3 rotate between said discs 1 and 2 in permanent frictional engagement therewith, said friction rollers 3 being mounted for rotation about their axes, and for adjustment along arcs drawn about centers M, respectively. The centers M lie in a plane normal to said shafts and at two points at the centers of the arcs, of said tracks drawn on two transverse planes through discs 1 and 2. A gear having bevel driving means is the basis of the new construction. An examination of the kinematic condition of this system, shows the following. When the friction rollers 3 are adjusted about the centers M, the apex S of the tangential cone is displaced along an arc $k$ concentric with the point M. Since in a bevel drive all of the cone apices meet at one point, the requirement of a theoretically accurate bevel drive is met only in two positions, i. e., in the positions in which the arc K intersects the common axis A of the shafts. In all of the other transmission positions, the theoretical cone apex is located above or beneath the actual apex.

Obviously, efficiency is impaired due to the deviation of the position of the cone apex from the theoretically correct position, so that in positions where the cone apex coincides with the axis A, the greatest efficiency is obtained, while in all other positions the efficiency is below maximum. The most favorable transmission position of the rollers 3 is indicated within the discs 1 and 2 dash lines. It can be seen from Figure 1 that the rollers 3 slide only to the extent that they deviate from the theoretical form of the cones. Obviously, this extent is extremely small, i. e., in the example shown, it will amount to only 1.6%. The difference between the theoretical form of the cone and the actual cone form is increased by displacing the apex of the cone, and therefore, the friction rollers have to slide to a greater extent in such case. In contrast to other gears, however, the sliding action in such system is rather limited and amounts for instance, in the case of the example shown in full lines, only to 2.7% and in case of the largest transmission ratio shown in dash-dotted lines, to 2.4%. The best efficiency can be obtained, with the transmission ratio most frequently used, by suitable selection of the angle of the cone; or, at least an efficiency in the neighborhood of said optimum may be obtained.

Figures 2 and 3 illustrate a simple embodiment of the invention having a manual adjusting device for securing the desired transmission ratio, for use in machine tools and the like. The driving disc 4 and the driven disc 5 are mounted on their respective coaxial shafts which are journalled in the gear housing 11. The friction rollers 6 are rotatably mounted in the frames 7, respectively, said friction rollers 6 being slidable axially on their shafts and biased by springs 8, by which the rollers 6 are provided with the contact pressure required for the frictional engagement with the discs 4 and 5. Meshing segments 9 and 10 are carried by the frames 7, respectively. The frames 7 are journaled in the housing 11 which is stationary, and they can be adjusted by means of the hand lever 12, to move the rollers 6 to secure the desired transmission ratio.

If the disc 4 be driven to rotate clockwise, the friction rollers 6 are rotated due to the friction and the latter, in turn, drive the disc 5 counterclockwise, by reason of their existing frictional engagement with the discs 4 and 5. The amount of power transmitted depends on the one hand, upon the width of the friction rollers 6 and on the other hand, upon the pressure applied. Three or more friction rollers may be employed in place of the two friction rollers 6 shown. In this way, the power to be transmitted is distributed over more than two friction couplings, so that a greater amount of power can be transmitted by the device. In this case, bevel gears can be advantageously used, in place of the segments 9 and 10, said bevel gears being in mesh with one another and turning all of the frames 7 simultaneously.

Figures 4 and 5 illustrate an embodiment of the invention having an automatically operating mechanism which can be advantageously employed in automotive vehicles with internal combustion engines. A simplified form of this embodiment, which will be first described, can also be used in machine tools and the like. This embodiment has a driving disc 14 adjustable friction rollers 15 and a driven disc 16. The friction rollers 15 are rotatably and axially displaceably mounted in frames 17, respectively, and biased against the discs 14 and 16 by means of the springs 18, respectively. The frames 17 are journaled in a carriage 19 and can be synchronously adjusted by means of meshing segments 20 and 21. The segment 20 is adjusted by means of a guiding member 23 and a pin 22, said member 23 being fixed in a stationary housing 24. The frame 19 is slidable in housing 24 and has an arm 25 connecting the frame 19 to an adjustable spring 26 and a piston 27. The spring 26 is connected to the housing 24 in such a manner that the tension of the spring 26 can be adjusted. The spring 26, when relieved holds the friction rollers 15 in the position of the highest transmission ratio. Piston 27, in cylinder 28 and feed line 29 are to be disregarded for the present, their function being presently explained. The operation of the device is as follows: When the clutch, not shown in the drawing, of the device is brought into engagement, considerable force is required and consequently, the friction rollers 15 tend to idle on the disc 16, because they are not yet able to rotate said disc 16 (as shown in the drawing, in counter-clockwise direction), whereby the frames 17 and carriage 19 together with the adjusting means 20, 21, 22 and the arm 25 are shifted under the tension of the spring 26. The meshing segments 20 and 21 in this embodiment are adjusted by the pin 22 guided in the guiding means 23. The drive will be gradually adjusted from the highest transmission ratio to a lower ratio until an equilibrium between the momentum of rotation of the motor and the momentum of rotation necessary to drive the machine on the one hand, and the tension of the spring on the other hand, is reached and the machine starts to run. The difference in the momentum of rotation between motor and mechanism is, so to speak, continuously measured and converted into an adjusting movement adjusting the drive to a predetermined transmission ratio. The more the machine speeds up, the more the difference in momentum of rotation decreases, i. e., the spring 26 is enabled to shift the carriage 19 backwards (in the drawing counter-clockwise) and thereby adjusts an increasing transmission ratio with the aid of the guiding means 23 and the adjusting means 22, 21, and 20, whereby a permanent equilibrium between the two momentums of rotation and the tension of the spring 26 is obtained. The tension of the spring 26 is adjustable, and its characteristic has to be adapted to the momentum of rotation of the motor. To assure proper shifting, the carriage 19 may be suitably guided in the housing 24.

The above described operation is adapted to a motor having constant speed of rotation, i. e., a condition as for instance, in a machine tool.

In automotive vehicles with internal combustion engines, the engine power is dependent upon the fuel supply. Entirely different degrees of power are required in case of the same transmission ratio, if the vehicle moves over a level surface, or moves upwardly or downwardly. To meet these conditions, the power of the motor is varied by means of the accelerator lever controlling the fuel supply. The mechanism of Figs. 4 and 5, the operation of which has been described in the foregoing does not meet these requirements, because the tension of the return spring 26 can be adapted to only one predetermined degree of power. But the spring 26 should be set and dimensioned in such a manner, that it adjusts the drive for the largest transmission ratio, when the smallest difference of momentum and full power of the motor is present. If the engine of an automotive vehicle is throttled to decrease the driving speed, for example, by driving with a half-opened throttle, the power of the motor will not be sufficient to tension the spring 26 to such an extent that a lower, most suitable transmission ratio, corresponding to the decreased power, is secured. The transmission ratio would instead remain adjusted to the maximum value of the transmission ratio and the engine would be stalled. Consequently, it is necessary that the drive be automatically and properly adjusted as a function of the counter-momentum of rotation of the vehicle wheels, as well as the instant momentum of rotation of the motor. This is accomplished by providing a servo-mechanism comprising piston 27 in cylinder 28 provided with suction feed line 29.

It is known that the degree of suction in the suction pipe of an internal combustion engine is inverse to the engine power, i. e. the suction is high when the engine power is low and the throttle slightly open, while the suction is low when the throttle is wide open and the engine power is high.

The purpose of the servo-mechanism 27, 28 and 29 is as follows: If the engine runs, for example, with a half-opened throttle, the engine does not produce the same amount of power as with a fully opened throttle, and the spring 26 would have been tensioned to a too great extent, as has been explained above, and the drive would be adjusted to a transmission ratio which is considerably too high, because the engine cannot cause the adjusting movement required to decrease the transmission ratio to the friction rollers 15 by overcoming the action of the spring 26. Consequently the engine would stop. However, with the servo-mechanism in the device, under such conditions, the piston 27 is drawn into the cylinder 28 and the return force of the spring 26 is weakened, under the influence of the suction in the suction line 29, at the throttle position assumed. Therefore, the difference of momentums necessary to adjust the rollers 15 to a lower transmission ratio is correspondingly lower, so that a transmission ratio most suitable to the engine power produced is adjusted.

A nozzle 30 is provided in the suction feed line 29 for the following purpose: It is assumed that the vehicle first runs over a level road with the throttle half open and the drive set to the highest transmission ratio. If the vehicle is driven up a hill, the drive is automatically adjusted to a smaller transmission ratio in accordance with the greater force required. Now, if the driver suddenly opens the throttle completely, the suction in the suction line 29 suddenly decreases. As a result, the suction in the cylinder 28 will simultaneously decrease and the piston 27 will be relieved, i. e., the drive will suddenly be adjusted to the highest transmission ratio. A certain time interval is necessary for the engine to change from one operative condition to another. The nozzle 30 is inserted to provide for this time interval, because the nozzle 30 delays the decrease of the suction in the cylinder 28, so that the engine gains the required time. The operation of the nozzle 30 is advantageous also when driving over a level road and accelerating the vehicle as desired, because the drive is first adjusted to a slightly lower transmission ratio when the throttle is suddenly and entirely opened. After the engine has speeded up, a higher transmission ratio is secured.

The effective length of the spring 26 can be determined to compensate for the decrease in power resulting from wear and tear after considerable operation of the engine, and to adjust the device for new engines.

Obviously instead of the two friction rollers 15, as shown, more than two may be provided, without modifying the operation of the device, whereby all of the operative steps occur as described.

Figure 6:
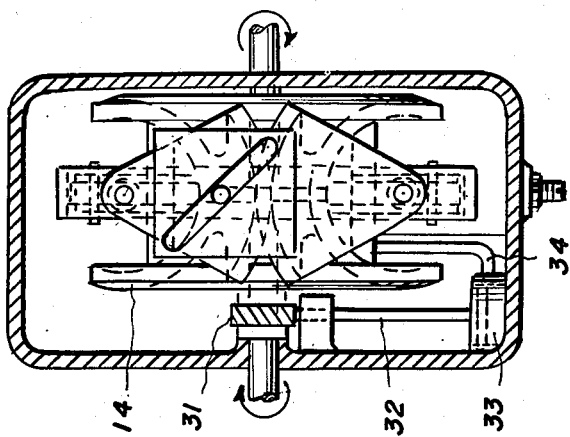

Figures 6 and 7 illustrate an embodiment with means for automatic adjustment of the drive which makes possible the maintenance of a predetermined constant speed. A worm gear 31 is mounted on the driving shaft of the disc 14, said gear 31 driving a centrifugal pump 33 through a worm shaft 32. The pump 33 draws oil from the oil sump of the device and forces it into a cylinder 35 through a line 34. The arm 25 of the adjusting mechanism is connected to a piston 36 in the cylinder 35. A coil spring 37 is disposed in the cylinder 35 below and bearing on the piston 36, said spring 37 being adjustable by means of a screw 38 and a plate 39. A throttle valve 40 is provided at the bottom of the cylinder 35.

When the drive is at rest, the spring 37 biases the piston 36 into its top position, whereby the drive is adjusted to the lowest transmission ratio by the arm 25. The portion of the cylinder 35 below the piston 36 is at that time filled with oil from the oil sump of the device passed through the throttle valve 40. If the clutch between the engine and the device be engaged, the centrifugal pump 33 is driven by the gear 31 and the shaft 32 and draws oil from the oil sump. This oil flows through the line 34 into the cylinder 35 above the piston 36, whereby the latter is moved downwardly, until the equilibrium, between the pressure produced by the pump 33, the differential momentums of the elements of the drive and the tension of the spring 37, is obtained by the adjusting operation of the drive by the arm 25. During this movement of the piston 36, the oil below the piston 36 is forced to return to the oil sump through the valve 40. The valve 40 has two purposes. First, it prevents the adjusting mechanism from oscillating, due to the resistance of the valve 40, and secondly, it delays the adjusting movement, when the vehicle is intentionally accelerated, so that the engine can run at a higher speed for a short period, than is designed for normal operation. The spring 37 is adjustable to compensate for wear and tear.

Having described my invention, what I claim is:

1. In a variable-speed power transmission mechanism, the combination of a housing; a driving shaft; a driven shaft, said shafts being journaled in said housing on a common axis; a pair of discs mounted on said shafts, respectively, each of said discs having an annular track which is concave in cross-section, said discs being so related that said tracks enclose an annular chamber substantially semi-circular in cross-section; a pair of frames pivoted in said housing and disposed in said chamber; means for rocking said frames; and a pair of rollers journaled in said frames, respectively, and biased into frictional engagement with said tracks, the axes of said rollers being disposed radially of said cross-section of said chamber, said frames being so related to said tracks that, when said frames are rocked about their axes, the apex of the tangential cone of each roller engaging said tracks lies constantly on an arc which is concentric with the axis of its frame and which intersects said common axis of said shafts at two points, said rollers and said tracks constituting an approximately accurate bevel drive in all positions of said frames, and the angle of the tangential cone of each roller being selected to produce the most efficient power transmission when said rollers and said tracks are related for power transmission at selected transmission ratios.

2. A mechanism according to claim 1 having a carriage shiftably mounted in said housing and having said frames pivoted therein, a spring adjustably mounted in said housing and connected to said carriage for biasing said carriage, a cylinder in said housing, a piston in said cylinder, a conduit leading from said cylinder, means responsive to the variable power in-put of the mechanism and connected by said conduit with said cylinder for reciprocating said piston, said piston being connected to said spring, the reciprocation of said piston modifying the effect of said spring on said carriage, said means for rocking said frames being automatically actuated by said shifting of said carriage.

3. A mechanism according to claim 1 having a carriage shiftably mounted in said housing and having said frames pivoted therein, a cylinder in said housing, a piston in said cylinder, a spring in said cylinder for biasing said piston in one direction, means responsive to the variable power in-put of the mechanism, adapted to supply fluid under pressure to said cylinder to move said piston in the other direction, said piston being connected with said carriage and said carriage being shifted by reciprocation of said piston, said means for rocking said frames being automatically actuated by said shifting of said carriage.

4. A mechanism according to claim 1 in which said means for rocking said frames consists in a pair of shafts journaled in said housing, on which said frames are mounted, respectively, one of said shafts having a portion projecting outwardly of said housing, a hand lever mounted on said portion for rocking said first shaft, and meshing segmental levers mounted on said shafts, respectively, for rocking said second shaft.

5. A mechanism according to claim 1 in which said means for rocking said frames consists in a carriage shiftably mounted in said housing, a pair of shafts journaled in said carriage, on which said frames are mounted, respectively, meshing segmental levers mounted on said shafts, respectively, a guideway disposed in said housing, a pin mounted on one of said levers and disposed in said guideway, and means adapted to shift said carriage relative to said housing, the shifting of said carriage causing said pin to travel in said guideway to effect rocking of said frames.

6. A mechanism according to claim 1 in which said means for rocking said frames consists in a carriage shiftably mounted in said housing, a pair of shafts journaled in said carriage, on which said frames are mounted, respectively, meshing segmental levers mounted on said shafts, respectively, a guideway disposed in said housing, a pin mounted on one of said levers and disposed in said guideway, a spring adjustably mounted in said housing and connected to said carriage for shifting said carriage, a cylinder in said housing, a piston in said cylinder, a conduit leading from said cylinder, means responsive to the variable power in-put of the mechanism and connected by said conduit with said cylinder for reciprocating said piston, said piston being connected to said spring, the reciprocation of said piston modifying the effect of said spring on said carriage, the shifting of said carriage causing said pin to travel in said guideway to effect rocking of said frames.

7. A mechanism according to claim 1 in which said means for rocking said frames consists in a carriage shiftably mounted in said housing, a pair of shafts journaled in said carriage, on which said frames are mounted, respectively, meshing segmental levers mounted on said shafts, respectively, a guideway disposed in said housing, a pin mounted on one of said levers and disposed in said guideway, a cylinder in said housing, a piston in said cylinder, a spring in said cylinder biasing said piston in one direction, means responsive to the variable power in-put of the mechanism, adapted to supply fluid under pressure to said cylinder to move said piston in the other direction, said piston being connected with said carriage and said carriage being shifted by reciprocation of said piston, the shifting of said carriage causing said pin to travel in said guideway to effect rocking of said frames.

EMIL SPRETER von KREUDENSTEIN.

REFERENCES CITED

The following references are of record in the file of this patent:

UNITED STATES PATENTS

| Number | Name | Date |
|---|---|---|
| 457,100 | Yates | Aug. 4, 1891 |
| 1,156,254 | Steiner | Oct. 12, 1915 |